June 15, 1943.                J. W. HOWELL                2,322,135
                           VEHICLE LICENSE PLATE
                            Filed Sept. 22, 1941

INVENTOR.
JOHN W. HOWELL
BY Elmer C. Landholt
ATTORNEY

Patented June 15, 1943

2,322,135

UNITED STATES PATENT OFFICE 2,322,135

VEHICLE LICENSE PLATE

John W. Howell, St. Louis, Mo.

Application September 22, 1941, Serial No. 411,843

1 Claim. (Cl. 40—125)

This invention relates to a vehicle license plate and more particularly to a composite plate consisting of a permanent number plate and a renewable non-metallic plate provided with the State name, date and a license number corresponding to the number in the permanent plate.

An object of this invention is attained in provision of a composite license plate comprising a permanent plate and a renewable plate, the renewable plate being constructed of a non-metallic material so that the metal normally used in the manufacture of license plates may be released for use in the present defense program.

A further object is to provide a license plate comprising a permanent plate having cut therein a pair of longitudinal openings and number cut-outs for permanent registration of the user, and a renewable plate having indicia printed thereon designating the State name, date and a number corresponding to the number cut in the permanent plate, the plates being assembled so that the indicia will be visible through the openings in the permanent plate and the surface of the renewable plate which may be of a suitable color will provide a background for the cut-out number in the permanent plate.

A still further object is to provide a composite license plate comprising a permanent plate and and a renewable plate, the renewable plate being constructed of an inexpensive water-proof non-metallic material which may be manufactured, printed and prepared for use at low cost, resulting in a large yearly saving for the State using such plates.

Other objects and advantages will be apparent from the following detailed description and accompanying drawing in which.

Figure 1:
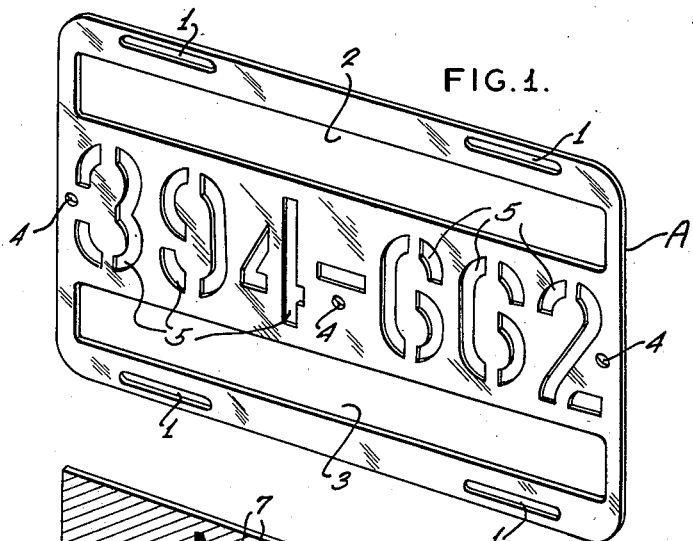
Fig. 1 is a perspective view of the permanent license plate.

Referring now to the drawing in detail, and particularly to Fig. 1 which illustrates a permanent plate A constructed of a suitable permanent material such as metal or plastic and provided near its upper and lower margins with small slots 1, upper and lower longitudinally extending openings 2 and 3, respectively, holes 4 and number cut-outs 5 spaced longitudinally of the plate and between openings 2 and 3.

Figure 2:
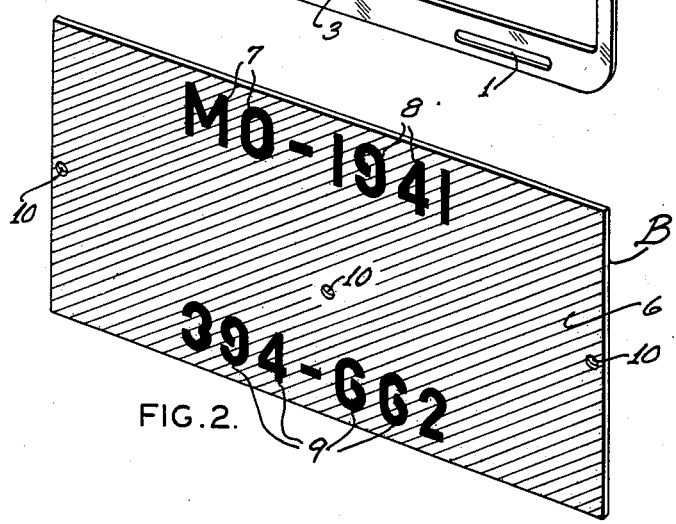
Fig. 2 is a perspective view of the renewable license plate.
Figure 4:
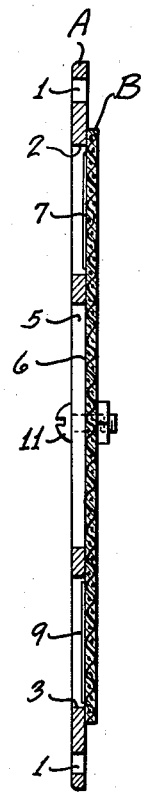
Fig. 4 is a vertical cross section as viewed along line 4—4 of Fig. 3.
Figure 3:
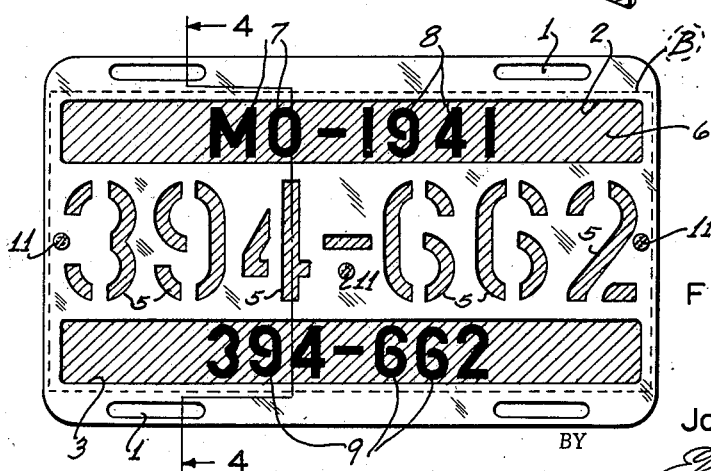
Fig. 3 is an elevational view of the composite license plate of this invention illustrating the plates of Figs. 1 and 2 in assembled relation.

Fig. 2 illustrates a renewable plate B constructed of a suitable water-proof non-metallic material such as a water-proof fabric now available at low cost and of suitable thickness to lend rigidity to the finished plate. The plate B is provided on one face thereof with a suitable colored surface 6 and has printed thereon near its upper margin a State name 7 and license period or year 8, and near the lower margin a license number 9 corresponding to the cut-out number 5 of the permanent plate A. The plate B is also provided with holes 10 which are positioned and spaced to match holes 4 in plate A.

In use the permanent plate A is sold or presented to the licensee as his permanent registration plate and is secured in a well known manner to a bracket of the vehicle upon which it is to be used such as by suitable bolts extending through the slots 1 and into the bracket, not shown. The renewable plate B is issued to the licensee as his yearly vehicle tax receipt or plate in a manner similar to the present method of issuance of license plates, the license number 9 printed on the renewable plate will correspond to the cut-out number 5 of the permanent plate thus preventing unauthorized use of either plate.

The renewable plate B is secured to the rear face of plate A by suitable bolts 11 passing through aligned holes 4 and 10 of plates A and B, respectively, with the colored surface of plate B visible through openings 2 and 3 and number cut-outs 5 to form a background therefor and provide increased visibility of the license number cut-outs in plate A. The State name 7 and license period or year 8 of plate B will now be readily visible through upper opening 2 and the printed license number will be visible through lower opening 3 in plate A.

It will be readily seen from the foregoing that the yearly renewable plate B provides a very inexpensive license plate which will not only decrease the manufacturing cost of license plates for the State using this construction, but will also release a large amount of metal normally used for such plates for use in defense production which is of great importance at the present time and in the future.

While only a single embodiment of this invention has been illustrated and described it is to be understood that certain changes and alterations may be made therein without departing from the spirit and intended scope of this invention.

I claim:

A composite license plate comprising a permanent plate having formed therein, a plurality of securing slots, upper and lower longitudinal openings, and number cut-outs extending longitudinally and between said openings; a renewable plate adapted to be secured to the rear face of said permanent plate and having on its forward face, a colored surface, printed indicia near its upper margin comprising a State name and license period, and printed indicia near its lower margin comprising a license number corresponding to the number cut-outs in the permanent plate; the State name and license period indicia being visible through the upper opening in the permanent plate and the license number indicia being visible through the lower opening in the permanent plate, and the color surface of the renewable plate providing a background for the number cut-outs in the permanent plate.

JOHN W. HOWELL.